US011924882B2

(12) United States Patent
Maeder et al.

(10) Patent No.: US 11,924,882 B2
(45) Date of Patent: Mar. 5, 2024

(54) METHOD AND APPARATUS FOR PROVIDING NON-SCHEDULED NETWORK ACCESS

(71) Applicant: NOKIA TECHNOLOGIES OY, Espoo (FI)

(72) Inventors: Andreas Maeder, Würzburg (DE); Richard Waldhauser, Munich (DE); Mikhail Vilgelm, Munich (DE); Murat Guersu, Munich (DE); Wolfgang Kellerer, Fürstenfeldbruck (DE)

(73) Assignee: NOKIA TECHNOLOGIES OY, Espoo (FI)

(*) Notice: Subject to any disclaimer, the term of this patent is extended or adjusted under 35 U.S.C. 154(b) by 361 days.

(21) Appl. No.: 17/414,516

(22) PCT Filed: Dec. 21, 2018

(86) PCT No.: PCT/EP2018/086486
§ 371 (c)(1),
(2) Date: Jun. 16, 2021

(87) PCT Pub. No.: WO2020/126022
PCT Pub. Date: Jun. 25, 2020

(65) Prior Publication Data
US 2022/0046715 A1    Feb. 10, 2022

(51) Int. Cl.
*H04W 74/08*    (2009.01)
*H04W 72/0446*    (2023.01)

(52) U.S. Cl.
CPC ... *H04W 74/0833* (2013.01); *H04W 72/0446* (2013.01)

(58) Field of Classification Search
CPC ............. H04W 74/02; H04W 72/0446; H04W 74/0833
See application file for complete search history.

(56) References Cited

U.S. PATENT DOCUMENTS

| 2019/0335364 A1* | 10/2019 | Liu ................... H04W 36/0077 |
| 2020/0127728 A1* | 4/2020 | Garcia ................ H04B 7/0871 |
| 2023/0087687 A1* | 3/2023 | Lopez ................ H04W 74/006 370/329 |

FOREIGN PATENT DOCUMENTS

WO    WO-2019154223 A1 *    8/2019

OTHER PUBLICATIONS

Qualcomm Incorporated: "On the need for inter-CSI-RS-resource feedback", 3GPP Draft; R1-121555 on the Need for Inter-CSI-RS-Resource Feedback, (3GPP), Mobile Competence Centre ; 650, Route Des Lucioles ; F-06921 Sophia-Antipolis Cedex ; France, vol. RAN WG1, Mar. 20, 2012 (Mar. 20, 2012), XP050599825 (Year: 2012).*
NTT Docomo et al: "Necessity of C-plane architecture enhancements for dual connectivity", 3GPP Draft; R2-131329_Necessity for C-Plane Architecture Enhancements, (3GPP), 650, Route Des Lucioles ; F-06921 Sophia-Antipolis Cedex; vol. RAN WG2, Apr. 2013 (Apr. 5, 2013), XP050699329 (Year: 2013).*

(Continued)

*Primary Examiner* — Mehmood B. Khan
(74) *Attorney, Agent, or Firm* — SQUIRE PATTON BOGGS (US) LLP (57) ABSTRACT

A terminal device selects are source indicator to be used for non-scheduled access and transmits it to an access device of the network in the non-scheduled access. If it determines based on a response to the non-scheduled access, that it has selected the same resource indicator as another terminal device, it keeps the resource indicator but selects different physical random access channel occasions by setting a time offset for a retransmission with the selected resource indicator. An initial waiting time may be determined by the access device (e.g. based on a traffic amount on the access channel) and transmitted to the terminal device for setting the time offset. Also, a layer (2) error caused by a random access channel resource collision of terminal devices may be (Continued)

determined at the access device and a feedback indicating a non-acknowledgement for layer (2) may be transmitted to colliding terminal devices.

12 Claims, 7 Drawing Sheets

(56) References Cited

OTHER PUBLICATIONS

CATT: "NR Paging Channel", 3GPP Draft; R1-1702064_NR_Paging, 3rd Generation Partnership Project (3GPP), Mobile Competence Centre; 650, Route Des Lucioles ; F-06921 Sophia-Antipolis Cedex ; France, vol. RAN WG1, No. Athens, Greece; Feb. 13, 2017-Feb. 17, 2017 Feb. 12, 2017 (Feb. 12, 2017), XP051209225 (Year: 2017).*

Qualcomm Incorporated: "On the need for inter-CSI-RS-resource feedback", 3GPP Draft; R1-121555 on the Need for Inter-CSI-RS-Resource Feedback, 3rd Generation Partnership Project (3GPP), vol. RAN WG1, No. Jeju, Korea; Mar. 26, 2012-Mar. 30, 2012, Mar. 20, 2012 (Mar. 20, 2012), XP050599825 (Year: 2012).*

International Search Report and Written Opinion dated Sep. 9, 2019 corresponding to International Patent Application No. PCT/EP2018/086486.

Qualcomm Incorporated, "On the need for inter-CSI-RS-resource feedback," 3GPP Draft; R1-121555, 3GPP TSG-RAN WG1 #68bis, Jeju, Korea, Mar. 20, 2012, XP050599825.

CATT, "NR Paging Channel," 3GPP Draft; R1-1702064, 3GPP TSG RAN WG1 Meeting #88, Athens, Greece, Feb. 12, 2017, XP051209225.

NTT Docomo, Inc., "Necessity of C-plane architecture enhancements for dual connectivity," 3GPP Draft; R2-131329, 3GPP TSG-RAN2#81bis, Chicago, USA, Apr. 5, 2013, XP050699329.

Communication pursuant to Article 94(3) EPC dated Nov. 21, 2023 corresponding to European Patent Application No. 18826369.3.

* cited by examiner

METHOD AND APPARATUS FOR PROVIDING NON-SCHEDULED NETWORK ACCESS

FIELD

Some example embodiments relate to the field of non-scheduled or random network access.

BACKGROUND

Cellular networks need to be capable and efficient to provide machine-to-machine (M2M) services. To achieve required short delay times, a self-initiated transmission mode has been provided, which is called non-scheduled access or random access. Efficient ways of managing non-scheduled access to cellular networks and energy efficiency of the access mechanism are desirable for the deployment of M2M networks.

Due to the distributed nature of random-access algorithms in cellular networks, multiple terminal devices (also called user equipment (UE)) may be using the same resources simultaneously. Therefore, they need to make random decisions that aim to break the correlation between users through a uniform decision over a certain range. A deployed randomization technique may randomly select one of the next random-access opportunities. Such a technique is efficient if the number of simultaneously accessing terminal devices is not large, such that the probability of collisions is low. However, even then, the same users may collide again, and the randomization technique for avoiding a second collision is the same. If, however, too many users collide initially, the back-off technique may not be sufficient to de-correlate transmission. Thus, terminal devices keep colliding with each other.

SUMMARY

There is provided according to a first aspect an apparatus comprising means for performing:
selecting a resource indicator (e.g. preamble or configuration index or the like) which indicates a channel resource to be used by a terminal device for non-scheduled access to a network;
transmitting the selected resource indicator to an access device of the network; and
maintaining the selected resource indicator and setting a time offset for a retransmission with the selected resource indicator based on a response received from the access device responsive to the non-scheduled access.

According to a second aspect, there is provided an apparatus comprising means for performing:
determining at an access device if a layer 2 error has been caused by a random access channel resource collision of two or more terminal devices and, if so, transmitting a feedback indicating a non-acknowledgement for layer 2 to the two or more terminal devices.

In an example, the feedback may be transmitted with at least one of the following indications:
an indicator of a layer 2 error caused by a random access channel resource collision of two or more terminal devices;
an indication of an acknowledgement or an indication that new data can be sent;
an indication of a non-acknowledgement or the lack of a new data indication or an indication that no new data shall be sent.

According to a third aspect, there is provided an apparatus comprising means for performing:
determining an initial waiting time at an access device of a network;
transmitting an information indicating the determined initial waiting time to a terminal device for setting a time offset for a retransmission with a selected resource indicator for a non-scheduled access to the network.

In an example, a traffic amount on a channel to be used by the terminal device for the non-scheduled access to the network may be determined, and the initial waiting time may be determined based on the determined traffic amount.

In a further example, the information indicating the determined initial waiting time may be transmitted with a system information block (e.g. SIB2) during an initial cell synchronization process or with a downlink control indicator (e.g. DCI).

According to a fourth aspect there is provided a method comprising: selecting a resource indicator which indicates a channel resource to be used by a terminal device for non-scheduled access to a network;
transmitting the selected resource indicator to an access device of the network; and
maintaining the selected resource indicator and setting a time offset for a retransmission with the selected resource indicator based on a response received from the access device responsive to the non-scheduled access.

According to a fifth aspect there is provided a method comprising:
determining at an access device if a layer 2 error has been caused by a random access channel resource collision of two or more terminal devices and, if so, transmitting a feedback indicating a non-acknowledgement for layer 2 to the two or more terminal devices.

According to a sixth aspect there is provided a method comprising:
determining an initial waiting time at an access device of a network;
transmitting an information indicating the determined initial waiting time to a terminal device for setting a time offset for a retransmission with a selected resource indicator for a non-scheduled access to the network.

The means of the apparatus of the first aspect may be configured to perform or the method of the second aspect may comprise:
monitoring access responses received from the network to detect at least one used resource indicator of a channel resource that has been allocated to another terminal device for non-scheduled channel access or at least one non-allowed resource indicator; and
deleting a detected used or non-allowed resource indicator from a list of resource indicators of available channel resources maintained at the terminal device.

In a first example, the means of the apparatus of the first aspect may be configured to perform:
transmitting a first scheduled transmission to the access device; and
adjusting the time offset based on a feedback received from the access device.

In a modification of the above first example, the means of the apparatus of the first aspect may be configured to perform:
using a parameter to adjust the time offset;
incrementing the parameter if the feedback indicates a non-acknowledgement for layer 2;

decrementing the parameter if the feedback indicates an acknowledgement; and maintaining the parameter if the feedback indicates a non-acknowledgement for layer 1.

In the above modification of the first example, the means of the apparatus of the first aspect may be configured to perform:

selecting one of available branches defined by a tree algorithm to determine the parameter used for adjusting the time offset.

Furthermore, in the above modification of the first example, the means of the apparatus of the first aspect may be configured to perform:

checking whether a channel has been used for the selected resource indicator;

decrementing the parameter if no channel resource has been allocated to the selected resource indicator; and adjusting the parameter based on an outcome of a connection request if a channel resource has been allocated to the selected resource indicator.

Additionally, in the above modification of the first example, the means of the apparatus of the first aspect may be configured to perform:

decrementing the parameter if a contention resolution response has been received from the access device; and incrementing the parameter if no contention resolution response has been received from the access device within a predetermined time period.

In a second example, the means of the apparatus of the first aspect may be configured to perform:

monitoring access responses received from the network to establish a list of available resource indicators for the selection of the resource indicator to be used by the terminal device for the non-scheduled access to the network.

In a modification of the second example, the means of the apparatus of the first aspect may be configured to perform:

monitoring a predetermined number of the access responses to determine at least one idle resource indicator that has been idle for a predetermined number of transmission frames.

In a third example, the means of the apparatus of the first aspect may be configured to perform:

determining a traffic amount on a channel to be used by the terminal device for the non-scheduled access to the network; and controlling the time offset based on the determined traffic amount.

In a fourth example, the means of the apparatus may be configured to perform:

checking for a response received from the access device in response to the transmission of the selected resource indicator; and initiating a retransmission of the selected resource indicator if no response is received within a predetermined time period.

In a fourth example, the means of the apparatuses of the first to third aspects and all its examples may comprise:

at least one processor; and at least one memory including computer program code, the at least one memory and computer program code configured to, with the at least one processor, cause the performance of the apparatus.

According to a seventh aspect there is provided a computer program product comprising instructions for causing an apparatus to perform at least the following:

selecting a resource indicator which indicates a channel resource to be used by a terminal device for non-scheduled access to a network;

transmitting the selected resource indicator to an access device of the network; and maintaining the selected resource indicator and setting a time offset for a retransmission with the selected resource indicator based on a response received from the access device responsive to the non-scheduled access.

According to an eighth aspect there is provided a computer program product comprising instructions for causing an apparatus to perform at least the following:

determining at an access device if a layer 2 error has been caused by a random access channel resource collision of two or more terminal devices and, if so, transmitting a feedback indicating a non-acknowledgement for layer 2 to the two or more terminal devices.

According to a ninth aspect there is provided a computer program product comprising instructions for causing an apparatus to perform at least the following:

determining an initial waiting time at an access device of a network;

transmitting an information indicating the determined initial waiting time to a terminal device for setting a time offset for a retransmission with a selected resource indicator for a non-scheduled access to the network.

The computer program products of the seventh to ninth aspects may be stored on a medium or may be downloaded from a network.

A chipset may comprise the apparatus as described herein.

BRIEF DESCRIPTION OF THE DRAWINGS

Some example embodiments will now be described with reference to the accompanying drawings in which.

DETAILED DESCRIPTION

The following describes in further detail some examples of systems, apparatuses and possible mechanisms for providing random access to a cellular network, such as a fifth generation (5G) cellular network. It is however noted that some embodiments may also be implemented in other systems, apparatuses and possible mechanisms for other types of networks with random access function. Some embodiments may address the coordination of the waiting time of the users in a distributed fashion. Some embodiments may provide resource selection rules for reduced delay and/or waiting time coordination for stable system operation. The feedback may be obtained by extending a feedback signaling in the system. This may be by using one or more of a hybrid automatic repeat request (HARQ), a random access response message of an access handshake procedure, and access barring.

M2M networks are used to connect, on the one side, a server running an application and processing data to make smart decisions (or to assist in the decision-making process) with, on the other side, a huge number of devices deployed in the internet of things (IoT) and interacting with the environment, with other machines and with human beings.

Figure 1:
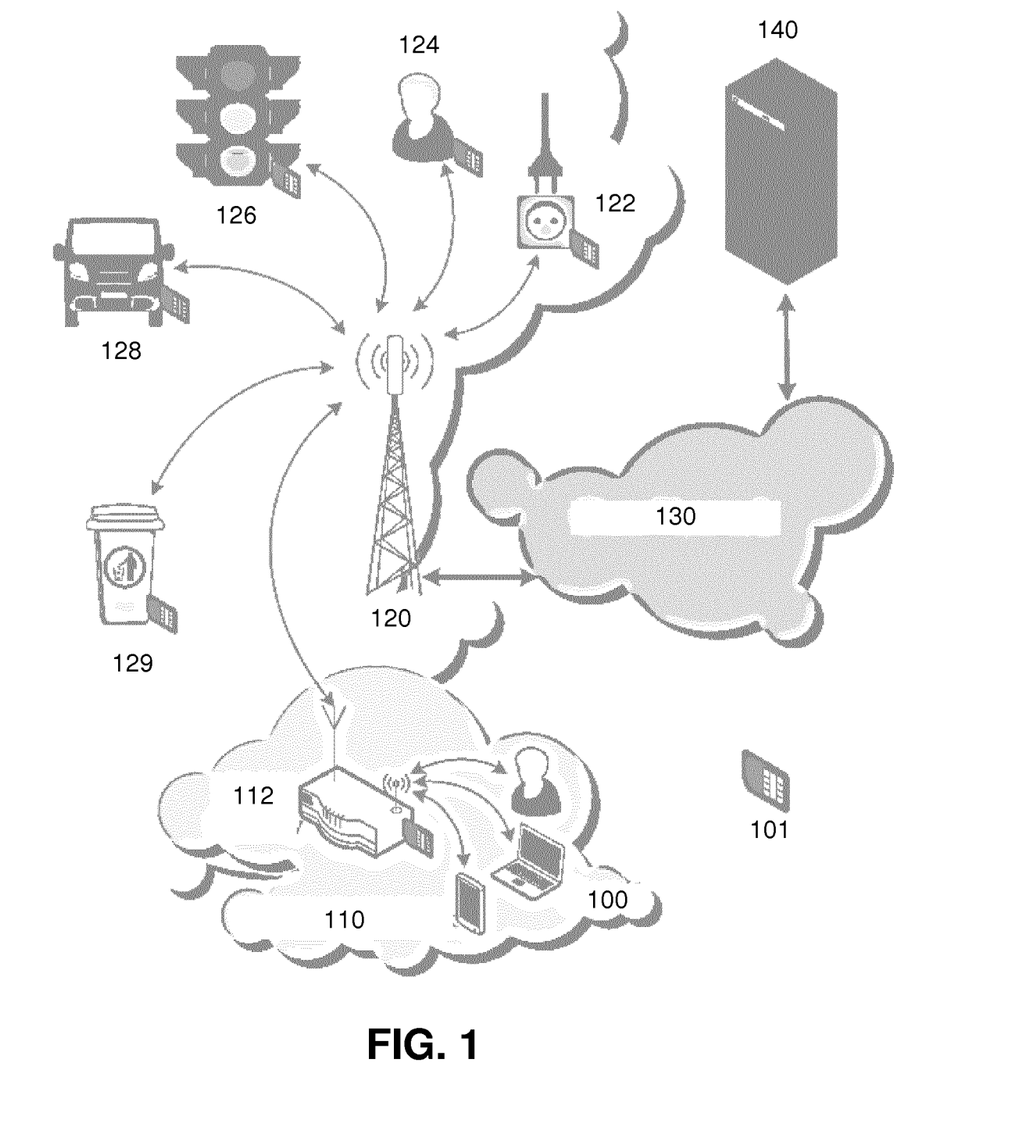
FIG. 1 shows an example of a M2M architecture.

FIG. 1 shows an example of an M2M architecture in which some embodiments can be implemented.

M2M devices 100 and applications can be connected through the network domain. This includes access networks (e.g. a cellular network 120) and core networks 130 and also M2M servers 140 providing services and enabling applications.

An M2M architecture may comprise the cellular network 120 and an optional M2M area network 110. The M2M devices 100 may connect to the core network 130 in any suitable way. For example, an M2M device may directly connect through the cellular network 120. The M2M device may have its own Subscriber Identity Module (SIM) card 101 or similar to have cellular connectivity. The M2M devices 100 may be organized locally, creating M2M area networks 110. The networks may exploit short-range technologies such as those based on Body Area Networks (BAN) (as defined in IEEE 802.15.6), Wireless Sensor Networks (as defined in IEEE 802.15.4 or IEEE 802.15.4e), and/or Local Area Networks based on Low-Power Wifi (as defined in IEEE 802.11). These M2M area networks 110 may then get connected to the core network 130 through M2M gateways 112.

As indicated in FIG. 1, further SIM-card based access options to the core network 130 via the cellular network 120 may be provided e.g. for at least one of smart grid applications 122, personal communications and electronic health (eHealth) applications 124, traffic flow applications 126, smart driving and electric vehicles 128 and smart bin collection applications 129.

The M2M devices 100 may be mobile terminals (called user equipment (UE) in 4G LTE or 5G terminology) or any other suitable device. The M2M devices may be capable of transmitting data autonomously. It is worth mentioning that the M2M devices 100 may also be referred to as machine type communication (MTC) devices. An M2M device 100 may trigger an access procedure to an access device such as a base station (called eNodeB in 4G Long Term Evolution (LTE) or NG-RAN node (e.g. a gNB) in 5G terminology). This may be when one of the following occurs: upon initial access to the cellular network 120 (i.e. in an association process); when receiving or transmitting new data while the M2M device 100 is not synchronized; upon transmission of new data when no scheduling request resources are configured on the uplink control channel; in case of a handover (i.e. change of associated eNodeB) to avoid a session drop; and after a radio link failure in order to re-establish the connection.

Two different forms of random access (RA) procedures are defined in LTE and 5G. There is a contention-based procedure where terminal devices (e.g. UEs) compete for the channel access. Since collisions can occur, this type of access may be reserved for delay-tolerant access requests. There is a contention-free procedure where the base station allocates specific access resources. This may be used for delay-constrained access requests that require higher probability of success, e.g., in handover situations as one example.

The random access channel (e.g. RACH in LTE) is formed by a periodic sequence of allocated time-frequency resources, called random access (RA) slots. These slots are reserved in the uplink channel of the network for the transmission of access requests. In the time domain, the duration of each RA slot depends on the format of the access requests. In the frequency domain, each RA slot occupies 1.08 MHz, which corresponds to the bandwidth of six physical resource blocks. The base station may broadcast information about the periodicity of the RA slots by means of a variable or parameter which may be referred to as the physical random access channel configuration index (called PRACH configuration channel in LTE). The periodicity may vary between one RA slot every two frames, i.e., every 20 ms, and one RA slot per subframe, i.e., every 1 ms.

Figure 2:
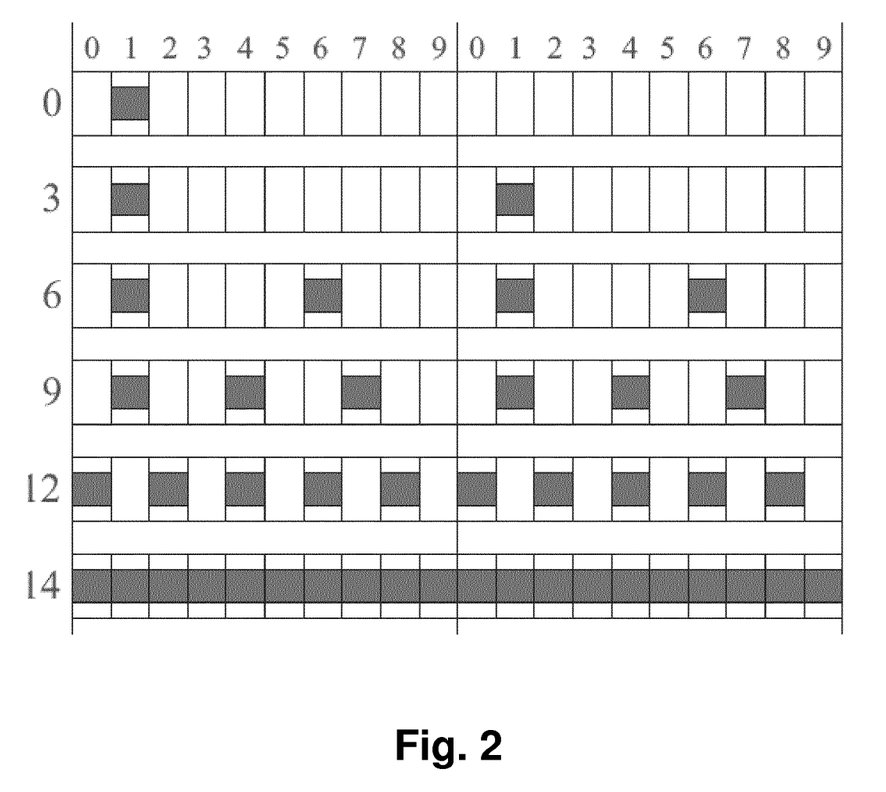
FIG. 2 shows examples of a random access configuration index.

FIG. 2 schematically shows an example of six random access channel configurations (with respective configuration indices "0", "3", "6", "9", "12" and "14") with an even and a subsequent odd frame of a duration of 10 ms each and comprising ten RA slots "0" to "9" with a duration of 1 ms each, wherein grey-colored squares in FIG. 2 represent RA slots where access requests can be transmitted by the M2M devices, while the remaining blank RA slots are available for other users. In total, LTE defines 64 possible configurations.

Figure 3:
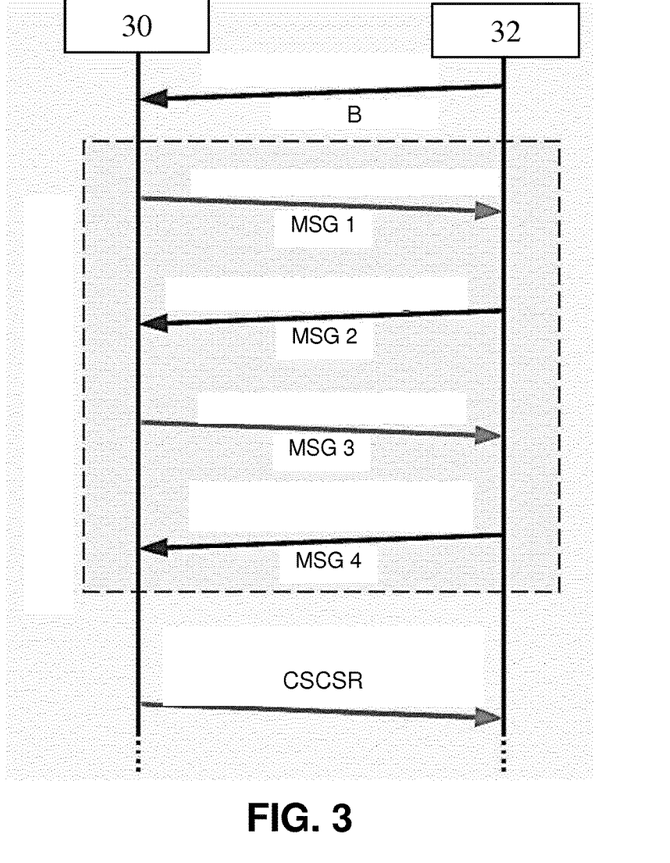
FIG. 3 shows an example of a contention-based random access procedure.

FIG. 3 shows a schematic signaling diagram of a contention-based random access procedure between an M2M device or other terminal device (e.g. UE) 30 and a base station (e.g. eNodeB or eNB) 32, wherein respective arrows represent a message transfer and its direction, and wherein the time proceeds from top to bottom of FIG. 3.

The contention-based random access procedure may consist of a handshake of four messages (e.g. MSG1 to MSG4 in LTE and 5G) between the terminal device 30 and the base station 32. Thus, an access request may be completed if the four messages have been successfully exchanged. Other contention-based random access procedures may involve more or less messages with different content.

Whenever the terminal device 30 requires access to a random access channel, it selects the next available RA slot of the random access channel to transmit an access request (MSG1) with a preamble, i.e., a digital signature which the device transmits in the RA slot. As already mentioned, in LTE, there are 64 orthogonal pseudo-random preambles (PRACH configurations) available for random access and the base station 32 periodically broadcasts in the downlink control channel an information B about the preambles which may be used for random access. The information B may correspond to or indicate a selected random access channel configuration index. However, the base station 32 may also reserve some of the preambles for contention-free access.

If two or more terminal devices transmit the same preamble in the same RA slot, a collision occurs. Otherwise, if differing preambles are transmitted in the same RA slot, these differing preambles can be detected by the base station 32 thanks to their orthogonality. The duration of a preamble depends on the size of the cell and can vary from 1 to 3 ms.

The larger the cell size, the longer the duration of the preamble may be in order to improve the reliability of reception at cell edges.

The selection of a preamble to transmit for each request can be done at random (among those available for contention-based access). The terminal device 30 waits a predetermined period (e.g. three subframes) after the transmission of a selected preamble for a time window to receive a random access response (RAR in LTE) message (MSG2) from the base station 32. The duration of this waiting window may be broadcast by the base station 32 and may be defined with a length between 2 and 10 subframes.

For each successfully decoded preamble, the base station 32 may compute an identifier (e.g. a random access radio network temporary identifier (RA-RNTI) in LTE) based on the RA slot where each preamble was sent. Then, the base station 32 transmits the random access response message through a physical downlink shared channel (e.g. PDSCH in LTE) with an identification of the detected preamble, timing alignment instructions to synchronize uplink transmissions, and uplink resource allocation that will be used by the terminal device 30 to transmit the third message of the handshake, and an assigned cell radio network temporary identifier (e.g. C-RNTI in LTE).

In case of failure, a back-off parameter b may be added to request the devices to wait for a random period of time before retrying the random access. This random back-off is used to reduce the probability of preamble collision by dispersing the access attempts over time. The random access response message is addressed to a specific random access radio network temporary identifier, i.e., to all devices that transmitted a preamble on a specific RA slot. The random access response message may contain different sub-headers associated to each detected preamble.

If the terminal device 30 receives a random access response message which is addressed to the random access radio network temporary identifier associated to the RA slot where the preamble was transmitted and which does not contain the identifier of the used preamble, it waits a random back-off time (according to the parameter b attached to the random access response message) before scheduling another preamble transmission attempt (MSG1). If multiple devices select the same preamble and the same RA slot, a collision will occur.

The base station 32 may be able to detect a collision based on different times of arrival. In such cases, it will not provide information related to that specific preamble in the next random access response message. However, if the respective terminal devices are at the same distance from the base station 32, and the two preambles have been received constructively, the collision may be undetected by the base station 32 and the same random access response information will be sent to all devices that transmitted the same preamble in the same RA slot. This will again cause a collision in the next message.

In the next step or the handshake procedure, the terminal device 30 transmits a connection request message (MSG3) to the base station 32 using the resources granted in the random access response message associated to the preamble transmitted in the selected RA slot. For the initial access, this message conveys the device identifier (e.g. C-RNTI in LTE) and the reason for the access request.

In case a preamble collision is not detected by the base station 32, more than one device will use the same uplink resources to transmit its connection request message, and a collision will occur at the base station 32. Therefore, no acknowledgment will be transmitted by the base station 32 and each device will retransmit its connection request message for the maximum number of retransmissions allowed before declaring access failure and scheduling a new access attempt.

Upon reception of a valid connection request message, the base station 32 transmits a contention resolution message (MSG4) as an answer to the connection request message. Therefore, if the terminal device 30 does not receive the contention resolution message, it determines a failure in the contention resolution process and schedules a new random access attempt, i.e., a new preamble transmission, thereby starting the handshake process again.

Each terminal device may keep a preamble transmission counter that is increased after each unsuccessful attempt. When the counter reaches a predetermined allowed value (which may be signaled as a system information by the base station 32), the network is declared unavailable by the device and a random access problem is indicated to upper layers.

The random access channel is allocated in the uplink and therefore, the transmission scheduler design may balance the trade-off between the amount of access opportunities to be scheduled per frame and the amount of resources available for data transmission. In M2M applications the number of requesting devices can be relatively high and the available bandwidth may be constrained.

Industrial internet of things (IoT) terminal devices have different activation times so that they may not stay connected. In some embodiments, feedback-based random access algorithms, such as algorithms for tree splitting based on the outcome of the transmission, may be used.

In the example discussed in relation to FIG. 3, after a failure on protocol layer 2 (i.e. L2 failure) has been detected, the terminal device 30 selects a random back-off time according to a uniform distribution between zero and the value of a back-off indicator or parameter b. The subsequent random access transmission is thus delayed by the selected back-off time.

In some embodiments, this back-off parameter b may be reactive to the traffic. This may avoid that continuous L2 failures may be observed.

An option to enable latency guarantees for non-scheduled access could be to modify the amount of coordination during the access algorithm. One way of doing this is improving the decision making with respect to the feedback from the base station 32. This could be achieved by tree algorithms for network access via using some traffic information knowledge for improved access performance without consideration of signaling.

According to some embodiments, a distributed tree algorithm may be used to ensure that at least two terminal devices (e.g. UEs) which have selected the same random access channel transmission occasion (i.e. time and frequency resource) and preamble, will keep the preamble but select different physical random access channel occasions which are then kept fixed.

Furthermore, feedback signaling may be used in some embodiments to ensure that other terminal devices do not use the same preamble for their transmission. A distributed tree algorithm is used to build a distributed set of random access channel resources. This set may comprise a random access channel preamble and a back-off time offset for the random access channel transmission opportunity (indicated by the above-mentioned parameter b) for the terminal devices (e.g. UEs). The retransmission time offset is determined in a distributed way by each UE, until all UEs are collision free.

According to some embodiments, a set of terminal devices A, B, C, D, E and F is considered. Each terminal device maintains a pool of eligible preambles which can be used for the random access channel. Now, it is assumed that the two terminal devices A and B have selected the same physical random access channel occasion (i.e., the same time and frequency resource) and the same preamble for their transmissions. The four other terminal devices C to F have selected different physical random access channel occasions. Consequently, the two terminal devices A and B transmit the same random access channel preamble in the selected physical random access channel occasion. All terminal devices A to F are monitoring and decoding the random access response (e.g. message MSG2 of FIG. 3) broadcasted on the physical downlink control channel, wherein the two terminal devices A and B receive an indication that their selected preamble has been received. The four other terminal devices C to F remove the indicated preamble from their pool of eligible preambles, e.g., after decoding a preamble identification (e.g. random access preamble identification (RAPID) in LTE) in the random access response. Now, the two terminal devices A and B both transmit a connection request message (e.g. message MSG3 of FIG. 3) using a temporary network identifier (e.g. a temporary cell radio network temporary identifier (TC-RNTI) as indicated in message MSG2 of FIG. 3). Consequently, for the physical radio access channel occasion selected by the two terminal devices A and B, a collision is detected by the base station. The two terminal devices A and B are made aware of the cause of the failed transmission by an indication that a collision has occurred. Accordingly, in response, the two terminal devices A and B keep the same preamble but perform another selection of a random access channel occasion (e.g. RA slot of the same preamble as time and frequency resource) based on a random selection of a parameter b for a back-off timer.

The connection request message can be sent from the terminal devices A and B to the base station as part of a hybrid automatic repeat request (HARQ) process. The base station then indicates in a HARQ feedback to the terminal devices A and B whether the transmission was successful or not.

It is however noted, that in some embodiments (e.g. in case of a 5G New Radio (NR) environment), no explicit HARQ feedback may be sent from the base station to the terminal devices. Rather, the base station may merely indicate to the terminal device whether new data should be sent. This can be understood as an implicit acknowledgement, although this is not the only interpretation.

The above procedure is repeated until the transmission has been successfully completed. This ensures that the pair of terminal devices A, B uses the same preamble, but different physical radio access channel occasions (e.g. different RA slots of the selected preamble). Moreover, this ensures that the other four terminal devices B, C, D and F use preambles different from the one of the two terminal devices A and B, and the same procedure is applied for them as well.

Thus, the terminal devices A to F may be configured to adjust the parameter b for the back-off time offset for the connection request message based on an HARQ feedback or another feedback in the downlink direction. As an example, the HARQ feedback may indicate at least one of a physical layer (L1) error caused e.g. by a decoding error due to noise limitations, or a data link layer (L2) error caused by a random access channel resource collision of two or more terminal devices.

Initially, a preamble is selected based on a monitoring of the random access response (e.g. message MSG2 of FIG. 3) to establish a pool of eligible random access channel preambles for each terminal device. Or, as an alternative, non-allowed ("barred") preambles could be broadcast.

Thus, by fixing terminal devices to the resource they have selected previously, and barring other terminal devices from accessing the same resource, a distributed ordered set of backlogged terminal devices is created, as no other terminal device can interfere with future transmissions.

In the following, example embodiments (which could be separate options which do not need to be all provided or can be used together) are described with reference to FIGS. 4 to 9 on the basis of a random access procedure for an LTE or LTE-Advanced system, which may for example be performed by a processor included in a terminal device (e.g. terminal device 30 of FIG. 3) and interacting with a memory device in which program code for causing the processor to execute the steps of the random access procedure according to the sample embodiment are stored. The example algorithms of FIGS. 4 to 9 may be encoded as computer program code for providing or causing the above processor to execute the steps of the respective algorithms. In alternative example embodiments, there may be other means (i.e., other than the processor/memory means) for implementing the algorithms of FIGS. 4 to 9. Such other means may be different circuitries with software/hardware combinations (for example, discrete circuitry, application specific integrated circuits (ASICs), field-programmable gate arrays (FPGAs), as well as a processor specifically configured by software to perform the respective function, or dual-core processors with software and corresponding digital signal processors, etc.).

Figure 4:
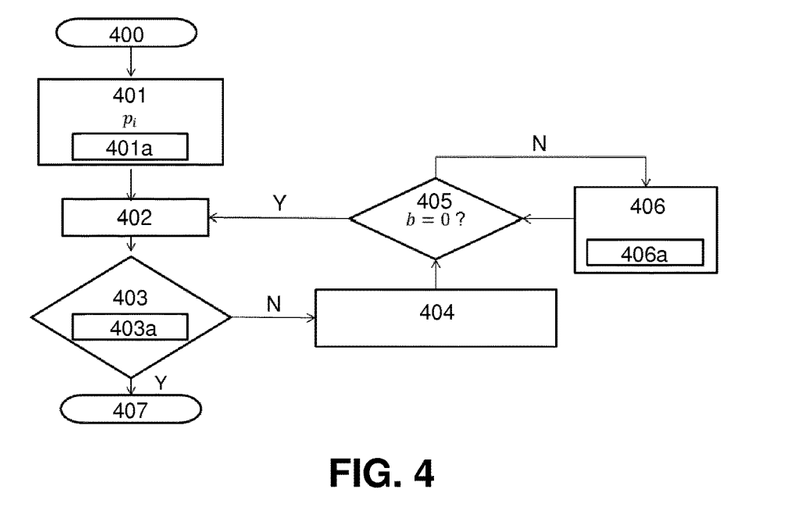
FIG. 4 shows a flow diagram of a random access procedure according to an example embodiment.

FIG. 4 shows a flow diagram of an example algorithm of a random access procedure according to some embodiments.

At the start in step 400, a terminal device of a user has a packet to transmit and doesn't have a connection to the base station. Therefore, in step 401, the terminal device checks which preamble it can select and selects a preamble $p_i$ from a set of available (i.e. idle) preambles by using a subroutine 401a. An example of the preamble selection in subroutine 401a will be described in more detail later with reference to FIG. 5.

Then, in step 402, the terminal device transmits the selected preamble $p_i$ to the base station (e.g. by using message MSG1 of FIG. 3).

Thereafter, in step 403, the terminal device checks if the preamble selection was successful or not by using a respective subroutine 403a. Examples of the success determination in subroutine 403a will be described in more detail later with reference to FIGS. 8 and 9.

If the terminal device determines in step 403 e.g. based on a received feedback (e.g. message MSG2 of FIG. 3) from the base station that the connection request with the selected preamble $p_i$ is successful, then the network access is a success and the process is terminated in step 407.

However, if the terminal device determines in step 403 e.g. based on the feedback received from the base station that the connection request with the selected preamble $p_i$ is not successful, the procedure branches to step 404 and the terminal device selects one of available branches (e.g. $0 \leq b < Q$) defined by a tree algorithm. The branch size Q can be pre-set or set dynamically. The branch selection in step 404, as indicated by parameter b, defines the retransmission time offset to be used by the terminal device. Thus, depending on the feedback and resulting selection in step 404, the terminal device waits a certain number of frames parameterized by the parameter b.

Then, in step 405, the terminal device checks whether the value of the selected parameter b is zero, which means that the retransmission time offset is zero. If so, the procedure jumps back to step 402 and the terminal transmits a new connection request with the same selected preamble $p_i$.

Otherwise, if the terminal device determines in step 405 that the selected parameter b differs from zero, the procedure proceeds to step 406 where the terminal device adjusts the parameter b (i.e. the back-off time) based on feedback received from the base station or another network device by using a subroutine 406a. Examples of the adjustment of the parameter b according to subroutine 406a are described later with reference to FIGS. 6 and 7.

Thereafter, the procedure returns to step 405 and the terminal device checks again whether the value of the selected parameter b is zero. This process is cyclically repeated until the terminal device has successfully accessed the network.

Figure 5:
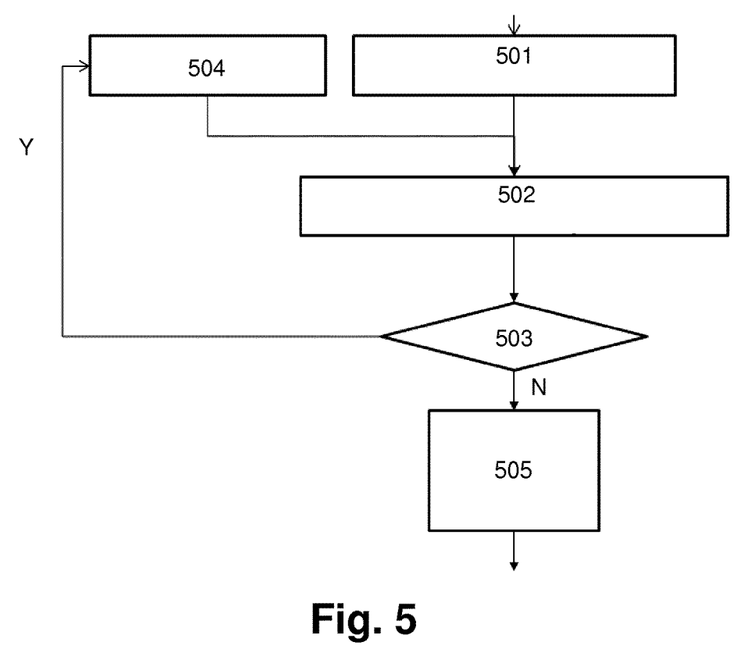
FIG. 5 shows a flow diagram of a preamble selection procedure which may be used in some embodiments.

FIG. 5 shows a flow diagram of an example algorithm of a preamble selection procedure which may be used in the subroutine 401a of the example embodiment of FIG. 4.

The procedure of FIG. 5 covers the initial preamble selection process of a random access procedure and may serve to separate initial arrivals and backlogged users (i.e., gated access). The base station continuously broadcasts through its random access response message (e.g. message MSG2 in FIG. 3) a usage information of preambles. As explained in the following, the algorithm of FIG. 5 fixes the terminal device of a user to the initial preamble it has selected. According to the procedure of FIG. 5, the terminal device monitors this random access response message and decides which preamble it can access without disturbing any backlogged users.

In order to select a preamble, the terminal device monitors in step 501 a predetermined number of Q consecutive random access response messages on a physical downlink control channel (e.g. the PDCCH in LTE). A predetermined tree algorithm is used to make sure that, if there are backlogged users on a preamble, this preamble is not idle for Q consecutive transmission frames.

The following part is an algorithmic explanation of selecting an idle preamble. In step 502, the terminal device adds all preambles that have not been indicated as selected preambles for Q consecutive random access response messages to a list. Thereby, it creates a set of preambles that have been idle for Q transmission frames. This parameter Q is also called the initial waiting time. The initial waiting time can be pre-configured or set with a message that the UE monitors. The message may be sent by the base station through several possible options. A first option could be to send it with a system information e.g. during an initial cell synchronization process. As a more specific example for LTE, this could be the system information block 2 (SIB2) that is also used to set RACH configuration values (for NR it would be SIB1). A further option could be to use a downlink control indicator (DCI) which carries information that may be used for decoding a captured physical signal. E.g., when scheduling the physical downlink shared channel (PDSCH), the base station can decide to set more than log_2 (Q−1) bits (as Q is greater or equal 2) in the DCI (e.g. in format "0_0") that sets the initial waiting time to a specific Q value. As an example, the DCI could be set to "0" (zero) as a pre-configured value. And other configuration values can be set based on a traffic estimation by the base station. The traffic estimation can be achieved e.g. through recording the history of actions for each terminal device or using signal level techniques such as checking the received power, or timing offsets. Such examples can be extended with any combination of these techniques or similar methods. Then, in step 503, the terminal device checks if the created list is empty. If so, the procedure branches off to step 504 and the terminal device continues to monitor the random access messages until it determines in step 502 that the set of idle preambles is not empty.

If the terminal device determines in step 503 that the set of idle preambles is not empty, it selects in step 505 one of the preambles from the set or list.

In the following, two example procedures for a back-off time adjustment that can be used in the subroutine 406a of the example embodiment of FIG. 4 are explained with reference to FIGS. 6 and 7.

The back-off time can be made dependent on the amount of traffic, wherein the amount of traffic can be inferred from the outcome of transmission attempts of terminal devices. The following two examples provide different approaches as to how this traffic information can be obtained.

Figure 6:
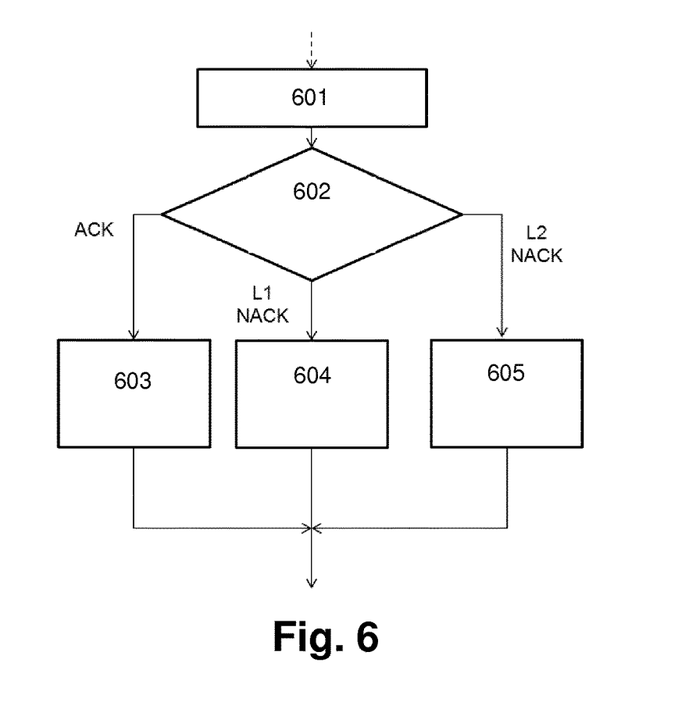
FIG. 6 shows a flow diagram of a first example of a back-off time adjustment procedure which may be used in some embodiments.

FIG. 6 shows a flow diagram of a first example of an algorithm for the back-off time adjustment procedure. The procedure of FIG. 6 covers a back-off time adjustment for stable operation of the algorithm.

In step 601, the terminal device waits a predetermined number of transmission frames to ensure that it has received feedback (e.g. a HARQ feedback or another feedback) to a connection request message (e.g. message MSG3 in FIG. 3) on its selected preamble.

Then, in step 602, the terminal device checks which feedback it has received. In this example, the algorithm makes use of an enhanced HARQ procedure which also transmits a data link layer or layer 2 non-acknowledgement (L2 NACK) in addition to a physical layer or layer 1 non-acknowledgement (L1 NACK) and an acknowledgement (ACK).

Based on the result of the checking step 602, the terminal device adjusts the feedback accordingly. If an L1 NACK feedback is received, the procedure branches to step 604 and the terminal device does not change the parameter b (i.e. the terminal device will try to transmit directly again in this case). If an L2 NACK feedback is received, the procedure branches to step 605 and the terminal device increment the parameter b by 1 or another predetermined increment (since the colliding terminal devices will need more resources). Finally, if an ACK feedback or no HARQ feedback is received, the procedure branches to step 603 and the terminal device decrements the parameter b by 1 or another predetermined decrement (since either no terminal device used that resource, or it is a success).

Figure 7:
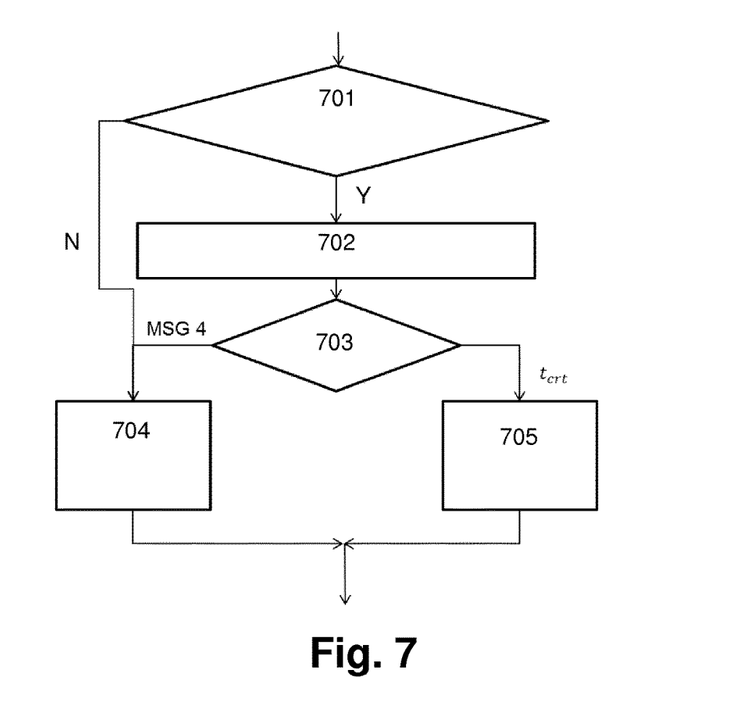
FIG. 7 shows a flow diagram of a second example of a back-off time adjustment procedure which may be used in some embodiments.

FIG. 7 shows a flow diagram of a second example of an algorithm for the back-off time adjustment procedure.

In the initial step 701, the terminal device monitors the random access response message (e.g. the message MSG2 of FIG. 3) received from the base station for the initially selected preamble $p_i$ and checks whether a resource has been allocated to the selected preamble $p_i$. More specifically, the random access response message is used by the base station to indicate the random access channel resource (e.g. preamble and time offset) allocated for the connection request message (e.g. message MSG3 of FIG. 3) for the selected preamble $p_i$.

If the terminal device determines in step 701 that no channel resource has been allocated yet for the selected preamble $p_i$, the procedure jumps to step 704 where the terminal device decrements the parameter b by "1" or another predetermined decrement.

Otherwise, if the terminal device determines in step 701 that a channel resource has already been allocated for the selected preamble $p_i$, the procedure continues with step 702 where a timer function with a contention resolution time $t_{crt}$ is started with respect to the start time of the allocated resource and the terminal device checks in the next step 703 an outcome, i.e., whether a contention resolution message (e.g. message MSG4 of FIG. 3) has been received during the timer operation.

If the terminal device determines in step 703 that a contention resolution message has been received before the contention resolution time $t_{crt}$ has expired (i.e. before the timer has run out), the procedure branches to step 704 where the terminal device decrements the parameter b by "1" or another predetermined decrement.

Otherwise, if the terminal device determines in step 703 that the contention resolution time $t_{crt}$ has expired (i.e. the timer has run out) without reception of a contention resolution message, the procedure branches to step 705 where the terminal device increments the parameter b by "1" or another predetermined increment.

Thus, the feedback mechanism for the random access channel (e.g. the RACH in LTE) is coupled to a timer function. If the contention resolution message (e.g. message MSG4 in FIG. 3) has not been received before the counted time has expired, an L2 failure is declared. However, in order to inform the terminal device about L1 failures after a connection request (e.g. message MSG3 in FIG. 3) there is already a HARQ feedback.

Alternatively or additionally, other signal processing techniques can be used to detect L2 failures from the received connection request message. As an example, an enhanced HARQ message (that extends the current HARQ format that already has L1 NACK and L1 ACK fields, by an additional a L2 NACK field) can be used to report these L2 failures. Such an additional L2 NACK field provides the advantages that the L2 NACK field can be used to bypass overlapping failures (where a L1 failure detection has been caused by a L2 failure and thus cannot be solved by a retransmission of the connection request message) by declaring L2 failure and initiating an L2 problem solving mechanism, and to bypass long procedures (caused by detection of L2 failures after run-out of the contention resolution timer and possible subsequent connection request retransmissions) and thereby speed up the resolution process.

However, as already mentioned, the feedback not necessarily has to be "HARQ feedback". Rather, any feedback that indicates (explicitly or implicitly) that an L2 failure has happened can be used.

In the following, two example procedures for a success decision procedure that can be used in the subroutine 403a of the example embodiment of FIG. 4 are explained with reference to FIGS. 8 and 9.

Figure 8:
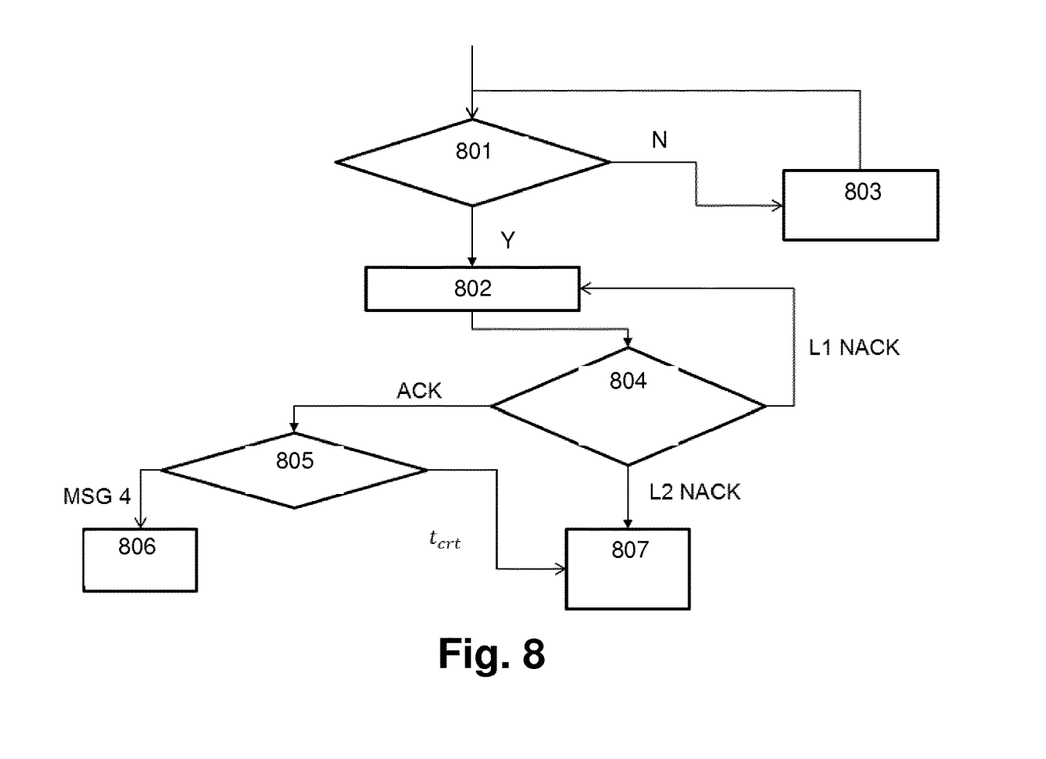
FIG. 8 shows a flow diagram of a first example of a success decision procedure which may be used in some embodiments.

FIG. 8 shows a flow diagram of a first example of an algorithm for the success decision procedure.

After transmitting the selected preamble $p_i$, the terminal device waits in step 801 for the receipt of a random access response message (e.g. message MSG2 in FIG. 3) from the base station. If no random access response message has been received within a predetermined time period, the procedure branches to step 803 and the terminal device determines an L1 failure and retransmits the selected preamble $p_i$ in on the next transmission frame.

Otherwise, if the terminal device determines in step 801, that a random access response message has been received, the procedure continues with step 802 and the terminal device transmits a connection request message (e.g. message MSG3 in FIG. 3) on the allocated resource.

Now, in the next step 804, the terminal device checks the received (HARQ) feedback. If it determines that the (HARQ) feedback indicates an L1 failure (e.g. L1 NACK), the procedure jumps back to step 802 and the terminal device retransmits the selected preamble $p_i$ on the next transmission frame. Otherwise, if the terminal device determines in step 804 that the (HARQ) feedback indicates an L2 failure (e.g. L2 NACK), the procedure branches to step 805 and the terminal device concludes that the preamble transmission was not successful. Otherwise, if the terminal device determines in step 804 that the (HARQ) feedback indicates no failure (e.g. ACK), the procedure branches to step 806 and the terminal device checks the outcome during operation of the contention resolution timer.

If no contention resolution message (e.g. message MSG4 of FIG. 3) has been received before the expiry of the contention resolution time $t_{crt}$, the procedure branches to step 805 and the terminal device concludes that the preamble transmission was not successful. Otherwise, if a contention resolution message (e.g. message MSG4 of FIG. 3) has been received before the expiry of the contention resolution time $t_{crt}$, the procedure branches to step 807 and the terminal device concludes that the preamble transmission was successful.

Figure 9:
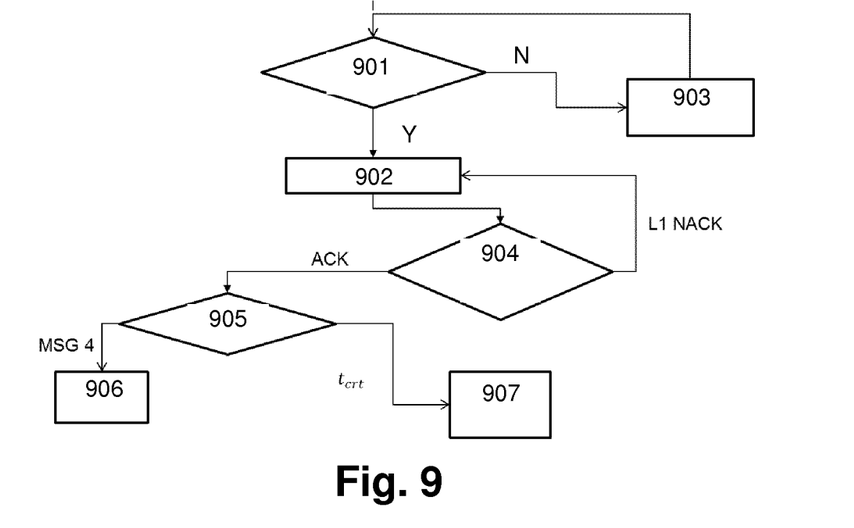
FIG. 9 shows a flow diagram of a second example of a success decision procedure which may be used in some embodiments.

FIG. 9 shows a flow diagram of a second example of an algorithm for the success decision procedure.

The decision process of the second example does not make use of the L2 NACK field of the enhanced HARQ mechanism or another feedback mechanism. As emphasized above, the resolution will take longer as using a timer requires more time than the L2 NACK feedback.

After transmitting the selected preamble $p_i$, the terminal device waits in step S901 for the receipt of a random access response message (e.g. message MSG2 in FIG. 3) from the base station. If no random access response message has been received within a predetermined time period, the procedure branches to step 903 and the terminal device declares a L1 failure and retransmits the selected preamble $p_i$ in on the next transmission frame.

Otherwise, if the terminal device determines in step 901, that a random access response message has been received, the procedure continues with step 902 and the terminal device transmits a connection request message (e.g. message MSG3 in FIG. 3) on the allocated resource.

Now, in the next step 904, the terminal device checks the received (HARQ) feedback. If it determines that the (HARQ) feedback indicates an L1 failure (e.g L1 NACK), the procedure jumps back to step 902 and the terminal device retransmits the selected preamble $p_i$ on the next transmission frame. Otherwise, if the terminal device determines in step 904 that the (HARQ) feedback indicates no failure (e.g. ACK), the procedure branches to step 905 and the terminal device checks the outcome during operation of the contention resolution timer.

If no contention resolution message (e.g. message MSG4 of FIG. 3) has been received before the expiry of the contention resolution time $t_{crt}$, the procedure branches to step 907 and the terminal device concludes that the preamble transmission was not successful. Otherwise, if a contention resolution message (e.g. message MSG4 of FIG. 3) has been received before the expiry of the contention resolution time $t_{crt}$, the procedure branches to step 906 and the terminal device concludes that the preamble transmission was successful.

In the following an example structure of the HARQ feedback is explained.

In the non-enhanced HARQ mechanism, a HARQ frame is formed of three consecutive bits with predetermined bit patterns for feedback signaling. E.g., bit pattern "000" may be used for signaling the L1 NACK feedback and bit pattern "111" for signaling the (L1) ACK feedback. Of course, other bit patterns could be used as well.

According to the second example of the success decision procedure of FIG. 8, the HARQ frame is suggested to be modified for signaling the L2 NACK feedback. This could be achieved by defining a third bit pattern for the L2 NACK feedback or by extending the HARQ frame by three further bits to signal the feedback L2 NACK with a bit pattern of "000" or any other bit pattern. In the latter example, the enhanced HARQ feedback would comprise a bit pattern of e.g. "000000" for L2 NACK feedback.

In another example, if the base station is a gNB (i.e. a eNB in 5G terminology) supporting a 5G NR air interface, no explicit HARQ feedback is used in downlink direction. Instead, as an example, the base station may set a "new data indicator (1 bit)" in the DCI in case that new data should be transmitted in the scheduled HARQ process.

Therefore, the proposed enhanced feedback could be part of the DCI as well. E.g., when scheduling the physical downlink shared channel (PDSCH), the base station can decide to set one bit in the DCI (e.g. in format 0_0) which indicates whether or not a L2 failure is the cause for retransmission. In this case, the "new data indicator" in the same DCI needs to be set to "0" (zero). Hence, there is no need for any pre-configuration or broadcast.

Furthermore, the L1 NACK feedback can be obtained as part of a demodulation scheme. A simple approach for processing of a received signal to obtain the decision of an L2 NACK feedback could be to average the received power or detect phase differences of overlapping signals.

Figure 10:
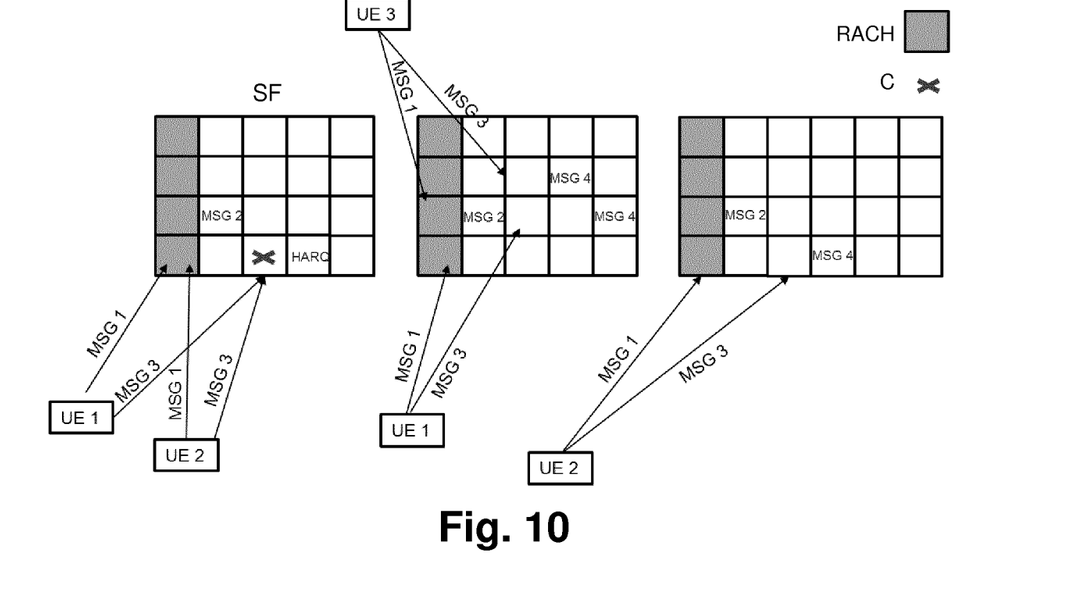
FIG. 10 shows an example of a scenario of some embodiments.

FIG. 10 shows an example of a scenario of some embodiments based on the proposal the above sample embodiment based on three subsequent single frames (SF) shown from the left to the right.

Three terminal devices UE1, UE2 and UE3 want to access the system where in total four preambles with four respective different time-frequency resources are available as random access channel (e.g. RACH in LTE). The available preambles are indicted by the grey-colored left-hand columns of the configuration matrices with four preambles and four time slots for each of the single frames. In the example embodiment, a binary tree is used, so that Q=2. The terminal devices UE1 and UE2 have monitored the random access response message (e.g. message MSG2 of FIG. 3) e.g. for the last two physical downlink control channels. As no preamble is accessed during these two physical downlink control channels, they know that all preambles are available. Now, both of them select one of these preambles randomly.

Then, as illustrated in the first single frame, where only a single time slot is allocated for the random access channel, the two terminal devices UE1 and UE2 select the same preamble in the left bottom corner of the configuration matrix. The random access response message indicates a resource allocation for the preamble chosen and the two terminal devices UE1 and UE2 transmit their connection request messages (e.g. message MSG3 in FIG. 3) on the same resource due to the same selected preamble. This leads to a collision (C) indicated by the "X" in second time slot in the last row of the left configuration matrix in FIG. 10, which is detected and an L2 NACK feedback is reported by the base station via the enhanced HARQ mechanism.

The third terminal device UE3 was also monitoring the physical downlink control channel for the random access response message and has observed that a resource has been allocated for the fourth preamble in the left bottom corner. Consequently, the third terminal device UE3 deleted the allocated fourth preamble from its available preamble list (set, pool) and selected one of the three other preambles. Since there was no other terminal device selecting the same preamble, the transmission was successful. The first terminal device UE1 has selected a parameter b=0 randomly, and therefore retransmitted directly. After reception of a contention resolution message (e.g. message MSG4 in FIG. 3), the random access process terminated successfully for the first terminal device UE1.

The second terminal device UE2 has received a successful HARQ feedback and decremented its parameter b by one. Since it has set the parameter b in the previous occasion to b=1, it is now decremented to b=0, so that the second terminal device UE2 will directly transmit. And since no other terminal device has been allowed to transmit, the transmission is a success without any L2 failure.

Some embodiment may provide faster random access through gated access. Thereby, collided users can be prioritized compared to initial arrivals. Moreover, the proposed random access procedure is robust against varying arrival patterns and performs an estimation of number of users while doing the resolution. This guarantees that all users will be resolved at a finite time. Given an arrival pattern, predetermined delay guarantees can be provided.

The delay distribution of the single tree algorithm can be written in terms of the number of slots required by a tree. The moment generating function of the size of the tree can be written in a recursive way as $$\sum_{i=0}^{N} B_{N,i} Q_i(z) Q_{N-i}(z),$$

where $B_{N,i}$ is the split probability which is $$\binom{N}{i} 2^{-i}$$

for a binary tree. The moment generating function can be calculated for different numbers N of terminal devices (e.g. UEs in LTE terms). An inverse z-transform can be used to calculate the probability distribution function. This distribution function can be used to give precise guarantees for the resolution time of terminal devices.

Figure 11:
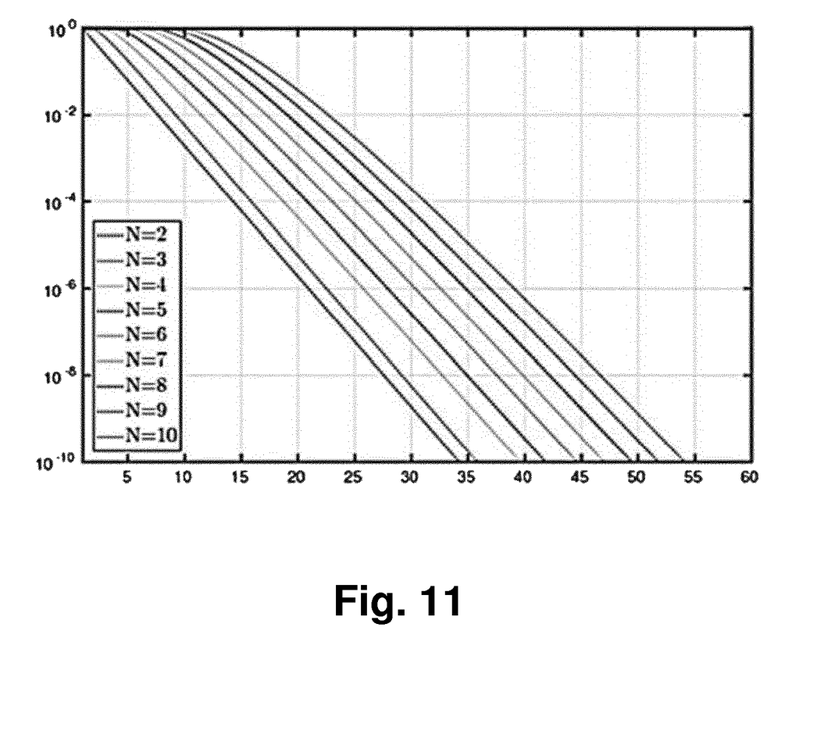
FIG. 11 shows a diagram of worst-case delay times of a tree algorithm with different numbers of terminal devices.

FIG. 11 shows a diagram of worst-case delay times of a tree algorithm with different numbers N of terminal devices.

In the diagram of FIG. 11 an inversed cumulative mass function is plotted against the resolution time expressed in the number of random access opportunities to show worst-case delay times of the tree algorithm for different numbers N of terminal devices, where N increases from N=2 to N=10 from the left to the right curve in FIG. 11.

In some embodiments, a terminal device selects a resource indicator to be used for non-scheduled access and transmits it to an access device of the network in the non-scheduled access. If it determines based on a response to the non-scheduled access, that it has selected the same resource indicator as another terminal device, it keeps the resource indicator but selects different physical random access channel occasions by setting a time offset for a retransmission with the selected resource indicator. An initial waiting time may be determined by the access device (e.g. based on a traffic amount on the access channel) and transmitted to the terminal device for setting the time offset. Also, a layer 2 error caused by a random access channel resource collision of terminal devices may be determined at the access device and a feedback indicating a non-acknowledgement for layer 2 may be transmitted to colliding terminal devices. Thereby, the retransmission time offset is determined in a distributed way by each terminal device until all terminal devices are free of collisions.

Some of the sample embodiments are not limited to cellular networks and may be implemented in any network that provides a random access procedure. Sample embodiments may thus vary within the scope of the attached claims. In general, some sample embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. Although some aspects of the embodiments have been illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Network nodes (e.g. terminal devices, base stations, servers etc.) described in connection with the above sample embodiments may not be stand-alone devices, but distributed computing systems coupled to a remote radio head. As an example, at least some components may be implemented in a cloud radio access network (cRAN) with splitted RAN architecture and centralized control of wireless functions to optimize performance and cost. Computer-intensive processing can be centralized and efficiently pooled to handle changes in traffic flows. In the cRAN architecture, real time (RT) functions may be deployed at the antenna site (i.e. in a distributed unit) to manage air interface resources, while non-real-time (NRT) control functions may be hosted centrally (i.e. in a central unit).

Furthermore, the above mentioned terminal devices may be networked IoT services or applications that use data mining and other big data related techniques as well as cloud computing, or stand-alone internet-connected IoT devices that can be monitored and/or controlled from a remote location. Moreover, the terminal devices may act as a platform supporting an internet service. More specifically, in the present IoT context, the terminal devices may act as a platform for a range of internet-connected devices, such as mobile phones, cars, household appliances, or homes with an internet-connected infrastructure. Thus, terminal devices may cover elements of a service that could be carried out in an end-user device, as well as in servers and other network elements.

Some sample embodiments may be implemented by computer software executable by a data processor of the terminal device or the base station, or by hardware, or by a combination of software and hardware. Further in this regard it should be noted that any blocks of the logic flow, e.g., as in FIGS. 4 to 9, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example digital versatile disk (DVD) and data variants thereof, CD.

The memory for storing executable program code or other data may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Furthermore, some embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of exemplary embodiments. However, various modifications and adaptations may become apparent to those skilled in the relevant arts in view of the foregoing description, when read in conjunction with the accompanying drawings and the appended claims. However, all such and similar modifications of the teachings of the sample embodiments will still fall within the scope of this invention as defined in the appended claims.

The invention claimed is:

1. An apparatus, comprising:
   at least one processor; and
   at least one memory including computer program code, the at least one memory and computer program code configured to, with the at least one processor, cause the apparatus to perform:
   selecting a resource indicator which indicates a channel resource to be used by a terminal device for non-scheduled access to a network;
   transmitting the selected resource indicator to an access device of the network;
   maintaining the selected resource indicator and setting a time offset for a retransmission with the selected resource indicator based on an access response received from the access device responsive to the non-scheduled access;
   monitoring access responses received from the network to detect at least one used resource indicator of a channel resource that has been allocated to another terminal device for non-scheduled channel access or at least one non-allowed resource indicator;
   deleting a detected used or non-allowed resource indicator from a list of resource indicators of available channel resources maintained at the terminal device;
   transmitting a first scheduled transmission to the access device;
   adjusting the time offset based on a feedback received from the access device;
   checking if the feedback comprises at least one of the following indications:

an indicator of a layer 2 error caused by a random access channel resource collision of two or more terminal devices;
an indication of an acknowledgement or an indication that new data can be sent; and
an indication of a non-acknowledgement or the lack of a new data indication or an indication that no new data shall be sent;
using a parameter to adjust the time offset;
incrementing the parameter if the feedback indicates a non-acknowledgement for layer 2;
decrementing the parameter if the feedback indicates an acknowledgement; and
maintaining the parameter if the feedback indicates a non-acknowledgement for layer 1.

2. The apparatus of claim 1, wherein the at least one memory and computer program code are further configured, with the at least one processor, to cause the apparatus to perform:
selecting one of available branches defined by a tree algorithm to determine the parameter used for adjusting the time offset.

3. The apparatus of claim 2, wherein the at least one memory and computer program code are further configured, with the at least one processor, to cause the apparatus to perform:
checking whether a channel resource has been allocated to the selected resource indicator;
decrementing the parameter if no channel resource has been allocated to the selected resource indicator; and
adjusting the parameter based on an outcome of a connection request if a channel resource has been allocated to the selected resource indicator.

4. The apparatus of claim 3, wherein the at least one memory and computer program code are further configured, with the at least one processor, to cause the apparatus perform:
decrementing the parameter if a contention resolution response has been received from the access device; and
incrementing the parameter if no contention resolution response has been received from the access device within a predetermined time period.

5. The apparatus of claim 4, wherein the at least one memory and computer program code are further configured, with the at least one processor, to cause the apparatus to perform:
monitoring access responses received from the network to establish a list of available resource indicators for the selection of the resource indicator to be used by the terminal device for the non-scheduled access to the network.

6. The apparatus of claim 5, wherein the at least one memory and computer program code are further configured, with the at least one processor, to cause the apparatus to perform:
monitoring a predetermined number of the access responses to determine at least one idle resource indicator that has been idle for a predetermined number of transmission frames.

7. The apparatus of claim 6, wherein the at least one memory and computer program code are further configured, with the at least one processor, to cause the apparatus to perform:
checking for an access response received from the access device in response to the transmission of the selected resource indicator; and
initiating a retransmission of the selected resource indicator if no access response is received within a predetermined time period.

8. An apparatus, comprising:
at least one processor; and
at least one memory including computer program code, the at least one memory and computer program code configured to, with the at least one processor, cause the apparatus to perform:
determining an initial waiting time at an access device of a network;
transmitting an information indicating the determined initial waiting time to a terminal device for setting a time offset for a retransmission with a selected resource indicator for a non-scheduled access to the network;
receiving a first scheduled transmission from the terminal device;
sending a feedback to the terminal device;
wherein the feedback comprises at least one of the following indications:
an indicator of a layer 2 error caused by a random access channel resource collision of two or more terminal devices;
an indication of an acknowledgement or an indication that new data can be sent; and
an indication of a non-acknowledgement or the lack of a new data indication or an indication that no new data shall be sent,
wherein the feedback is for the terminal device to adjust the time offset based on the feedback by using a parameter, and
wherein the time offset is adjusted by incrementing the parameter if the feedback indicates a non-acknowledgement for layer 2; by decrementing the parameter if the feedback indicates an acknowledgement; and wherein the time offset is maintained if the feedback indicates a non-acknowledgement for layer 1.

9. The apparatus of claim 8, wherein the at least one memory and computer program code are further configured, with the at least one processor, to cause the apparatus to perform:
determining a traffic amount on a channel to be used by the terminal device for the non-scheduled access to the network; and
determining the initial waiting time based on the determined traffic amount.

10. The apparatus of claim 9, wherein the at least one memory and computer program code are further configured, with the at least one processor, to cause the apparatus to perform:
transmitting the information indicating the determined initial waiting time with a system information block during an initial cell synchronization process or with a downlink control indicator.

11. A method comprising:
selecting a resource indicator which indicates a channel resource to be used by a terminal device for non-scheduled access to a network;
transmitting the selected resource indicator to an access device of the network;
maintaining the selected resource indicator and setting a time offset for a retransmission with the selected resource indicator based on an access response received from the access device responsive to the non-scheduled access;
monitoring access responses received from the network to detect at least one used resource indicator of a channel resource that has been allocated to another terminal device for non-scheduled channel access or at least one non-allowed resource indicator;
deleting a detected used or non-allowed resource indicator from a list of resource indicators of available channel resources maintained at the terminal device;
transmitting a first scheduled transmission to the access device;
adjusting the time offset based on a feedback received from the access device;
checking if the feedback comprises at least one of the following indications:
  an indicator of a layer 2 error caused by a random access channel resource collision of two or more terminal devices;
  an indication of an acknowledgement or an indication that new data can be sent;
  an indication of a non-acknowledgement or the lack of a new data indication or an indication that no new data shall be sent;
using a parameter to adjust the time offset;
incrementing the parameter if the feedback indicates a non-acknowledgement for layer 2;
decrementing the parameter if the feedback indicates an acknowledgement; and
maintaining the parameter if the feedback indicates a non-acknowledgement for layer 1.

12. A method comprising:
determining an initial waiting time at an access device of a network;
transmitting an information indicating the determined initial waiting time to a terminal device for setting a time offset for a retransmission with a selected resource indicator for a non-scheduled access to the network;
receiving a first scheduled transmission from the terminal device;
sending a feedback to the terminal device;
wherein the feedback comprises at least one of the following indications:
  an indicator of a layer 2 error caused by a random access channel resource collision of two or more terminal devices;
  an indication of an acknowledgement or an indication that new data can be sent; and
  an indication of a non-acknowledgement or the lack of a new data indication or an indication that no new data shall be sent; and
wherein the feedback is for the terminal device to adjust the time offset based on the feedback by using a parameter, wherein the time offset is adjusted by incrementing the parameter if the feedback indicates a non-acknowledgement for layer 2; by decrementing the parameter if the feedback indicates an acknowledgement; and wherein the time offset is maintained if the feedback indicates a non-acknowledgement for layer 1.

* * * * *